US007239531B2

(12) United States Patent
Oh

(10) Patent No.: US 7,239,531 B2
(45) Date of Patent: Jul. 3, 2007

(54) RESONANT LOSSLESS CIRCUIT FOR PROVIDING A LOW OPERATING VOLTAGE IN POWER CONVERTER

(75) Inventor: In-Hwan Oh, Cupertino, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 10/803,303

(22) Filed: Mar. 18, 2004

(65) Prior Publication Data

US 2005/0207185 A1 Sep. 22, 2005

(51) Int. Cl.
*H02M 3/335* (2006.01)

(52) U.S. Cl. ................................ 363/21.02; 363/21.03

(58) Field of Classification Search ............ 363/21.02, 363/21.03, 131

See application file for complete search history.

(56) References Cited

U.S. PATENT DOCUMENTS 4,992,702 A * 2/1991 Shimizu et al. ............. 315/219
5,621,623 A 4/1997 Kuriyama et al.
5,633,579 A 5/1997 Kim
5,703,763 A 12/1997 Smeets
5,835,361 A * 11/1998 Fitzgerald ................ 363/21.03
6,107,749 A * 8/2000 Nilssen ....................... 315/219
6,130,826 A 10/2000 Matsumoto
6,233,165 B1 5/2001 Irissou et al.
6,366,476 B1 * 4/2002 Yasumura ................ 363/21.02

* cited by examiner

*Primary Examiner*—Shawn Riley
(74) *Attorney, Agent, or Firm*—Sidley Austin LLP

(57) ABSTRACT

A converter-controller includes a power device, coupled to the primary coil of a transformer, a resonant circuit, coupled to the primary coil and the power device, a voltage regulator, coupled to the resonant circuit, and a control logic, coupled to the voltage regulator. The converter-controller does not need a snubber circuit. Further, the transformer structure of the converter-controller does not need additional auxiliary windings around the transformer core. The described converter-controller makes it possible to use low voltage integrated circuits in high voltage applications.

16 Claims, 5 Drawing Sheets

RESONANT LOSSLESS CIRCUIT FOR PROVIDING A LOW OPERATING VOLTAGE IN POWER CONVERTER

FIELD OF INVENTION

The present invention relates to control circuits of converters and more particularly to lossless resonant circuits for providing a low operating voltage for control circuits.

DESCRIPTION OF RELATED ART

A typical converter includes a control circuit with power devices, a transformer having a primary winding and a secondary winding, where the secondary winding is capable of generating an output voltage by stepping up or down the input, or primary, voltage. The rate of stepping up or down the input voltage is determined by the ratio of the number of windings of the primary and the secondary windings. The degree of voltage conversion is controlled by a control logic, or control circuit. While Flyback converters often work at several hundred volts, their control logic operates at about ten volts. Therefore, in the design of these controllers a low operating voltage has to be provided to the control logic.

Many existing Flyback converters provide low operating voltages for their control logic by using an additional auxiliary winding on the transformer core besides the primary and secondary windings. This auxiliary winding contains only a few turns, thus generating a low voltage for the control circuit. However, this auxiliary winding makes the transformer core more complex and also increases the price of the circuit.

Other Flyback converters use snubber circuits. These snubbers consist of a resistor—capacitor—diode circuit coupled between a control power device and the high voltage terminal in the primary circuit of the converter. These snubbers are very popular because of the simplicity of their design. However, the resistor dissipates a large amount of power, lowering the efficiency of the power conversion.

In some existing circuits, an RC bridge or a resistor ladder is used to provide an operating voltage for the control logic. In such circuitry, however, there is considerable power dissipation in the resistors, leading to losses in the operation of the circuitry. In some existing designs a combination of auxiliary windings and resistor circuits is applied. However, these circuits still exhibit considerable dissipation.

SUMMARY

Briefly and generally, embodiments of the invention include a converter-controller, which can be operated to control a converter. The converter has a transformer, which has a primary and a secondary windings. The converter-controller includes a power device, coupled to the primary coil of the transformer, a resonant circuit, coupled to the primary coil and the power device, a voltage regulator, coupled to the resonant circuit, and control logic, coupled to the voltage regulator.

Aspects of the invention include that it does not need a snubber circuit, and therefore can be operated without power dissipation.

Other aspects include that embodiments do not need additional auxiliary windings around the transformer core, thus having a simpler transformer structure and lowering the price of the circuit.

Embodiments of the invention make it possible to use low operating voltage integrated control circuits in a high voltage Flyback converter. Finally, embodiments have low electromagnetic interference (EMI), therefore generating a smooth resonance of voltage and current.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1–5 of the drawings. Like numerals are used for like and corresponding parts of the various drawings.

Figure 1:
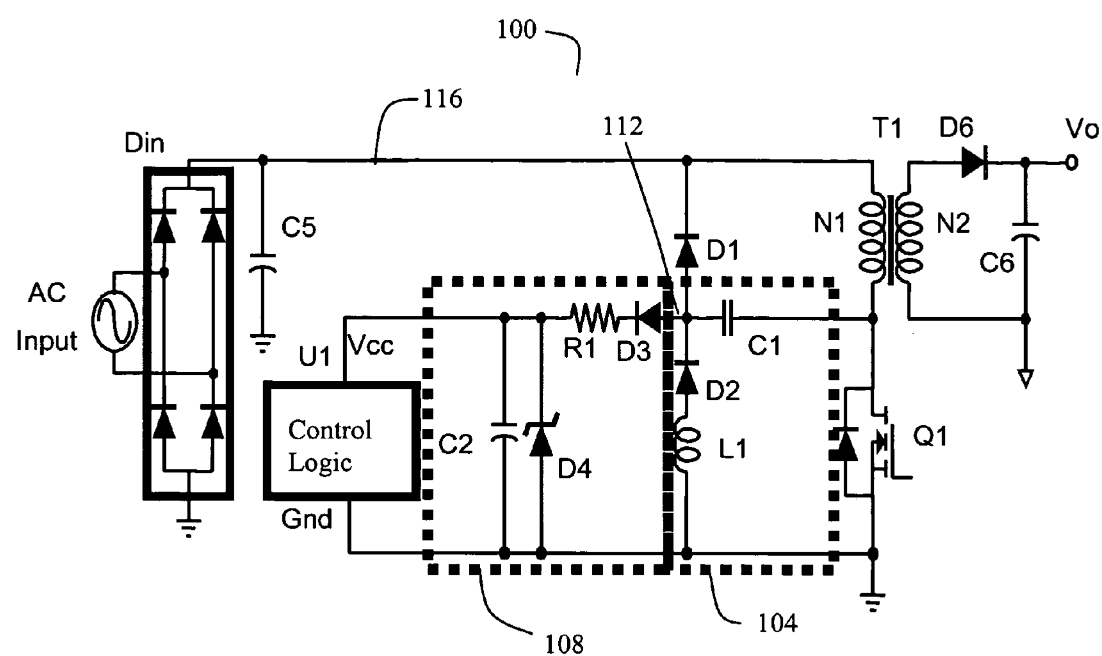
FIG. 1 is a block diagram of a converter-controller, according to an embodiment of the invention.

FIG. 1 illustrates a converter-controller 100 according to embodiments of the invention. Converter-controller 100 can be operated to control a converter, which has a transformer T1. Transformer T1 has a primary winding N1 and a secondary winding N2. Converter-controller 100 includes a power device Q1, coupled to primary winding N1 of transformer T1, and a resonant circuit 104, coupled to primary winding N1 and power device Q1. Converter-controller 100 further includes a voltage regulator 108. Voltage regulator 108 is coupled to resonant circuit 104 and to a control logic U1.

In various embodiments power device Q1 can be a MOS-FET, a bipolar junction transistor, or an Insulated Gate Bipolar Transistor (IGBT).

In some embodiments resonant circuit 104 includes a central node 112 with voltage Va, a resonant capacitor C1, coupled between central node 112 and power device Q1, a resonant diode D2, which has an anode and a cathode, the cathode of resonant diode D2 coupled to central node 112, and a resonant inductor L1, coupled between the anode of resonant diode D2 and a ground.

Voltage regulator 108 includes a regulator diode D3, which has an anode and a cathode, the anode of regulator diode D3 coupled to central node 112, a regulator resistor R1, coupled to the cathode of regulator diode D3, a Zener diode D4, coupled between regulator resistor R1 and a ground, and a regulator capacitor C2, coupled in parallel to Zener diode D4.

Control logic U1 is coupled in parallel to regulator capacitor C2. Control logic U1 is coupled to a gate of power device Q1 (not shown). Control logic is operable to control the voltage generated in the secondary coil of the converter by controlling the ON and OFF times of power device Q1 during switching cycles, as described below.

In various embodiments one or more of regulator diode D3, Zener diode D4, regulator capacitor C2, regulator resistor R1, parts or all of resonant circuit 104, power device Q1, and control logic U1 can be formed on an integrated circuit.

Figure 2:
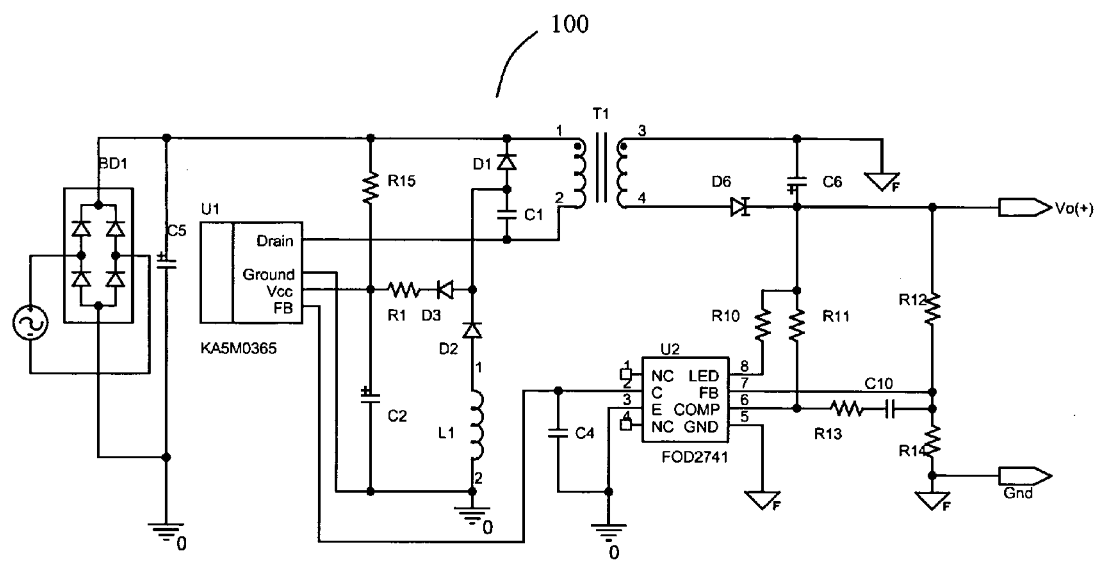
FIG. 2 is an implementation of a converter-controller according to an embodiment of the invention.

For example, in the embodiment of FIG. 2, control logic U1, Zener diode D4, and power device Q1 are formed on a single integrated circuit.

Converter-controller 100 further includes a high voltage link 116, coupled to primary winding N1. In various embodiments high voltage link 116 can be powered by a DC source or a rectified AC source. For example, in FIGS. 1 and 2, high voltage link 116 is powered by a rectified AC source.

Central node 112 of resonant circuit 104 is coupled to high voltage link 116 through a connecting diode D1 and regulator resistor R1 is coupled to high voltage link 116 through a connecting resistor R15.

FIG. 2 illustrates an embodiment of the invention. Corresponding circuit elements are labeled the same as in FIG. 1. As mentioned before, in this embodiment control logic U1, Zener diode D4, and power device Q1 are integrated into an integrated circuit 120. Power device Q1 is coupled between pins labeled Drain and Ground. Zener diode D4 is coupled between pins labeled Vcc and Ground. An integrated circuit with these attributes is, for example, Fairchild switch KA5M0365. In other embodiments other combination of the above circuit elements can be integrated on an integrated circuit.

The secondary circuit, which contains secondary winding N2, has a typical architecture. In this embodiment secondary winding N2 is coupled to control logic U1 to provide a feedback signal. Besides some standard circuit elements, the feedback circuit contains integrated circuit U2. Integrated circuit U2 provides a feedback signal without electrical coupling between the primary and the secondary circuit. This type of coupling is sometimes referred to as Galvanic isolation. This functionality can be achieved, for example, by employing a coupled photodiode-phototransistor pair. The photodiode emits a light signal in proportion to the current flowing through it and the phototransistor senses the emitted light and generates a feedback signal proportional to the sensed light. An example of an integrated circuit with a coupled photodiode-phototransistor pair is the Fairchild FOD2741 integrated circuit. Many other feedback circuit designs are well known in the art and can be employed in other embodiments.

Several types of converters are known in the arts. In the following two types of converters will be detailed, but the scope of the invention is not limited to these two types, but is understood to cover several alternatives as well.

A converter can be of the Flyback type or the Forward type, depending how the secondary coil is connected to the load circuit relative to the primary winding. In Flyback converters the input energy is stored in transformer T1, when power device Q1 is turned ON. The energy is transferred to the load, or secondary, side when power device Q1 is turned OFF. Forward converters operate the opposite way. The energy is transferred to the load side, when Q1 is turned ON, and there is no power conversion when Q1 is turned OFF. Since in Forward converters the energy is not stored in the transformer, the size of the transformer can be chosen to be smaller. The direction of windings is indicated by the black dot in the figures, as is customary.

When coupled to different types of converters, converter-controller 100 can be operated to control an output voltage of the converters. In some embodiments, converter-controller 100 periodically switches ON and OFF power device Q1, a process sometimes called a switching cycle. In these embodiments the output voltage of the converter is controlled by converter-controller 100 controlling the length of the switch-ON and switch-OFF intervals of the switching cycle. In embodiments of the invention, converter-controller 100 switches ON and OFF power device Q1 by control logic U1 switching the gate of power device Q1.

Figure 3:
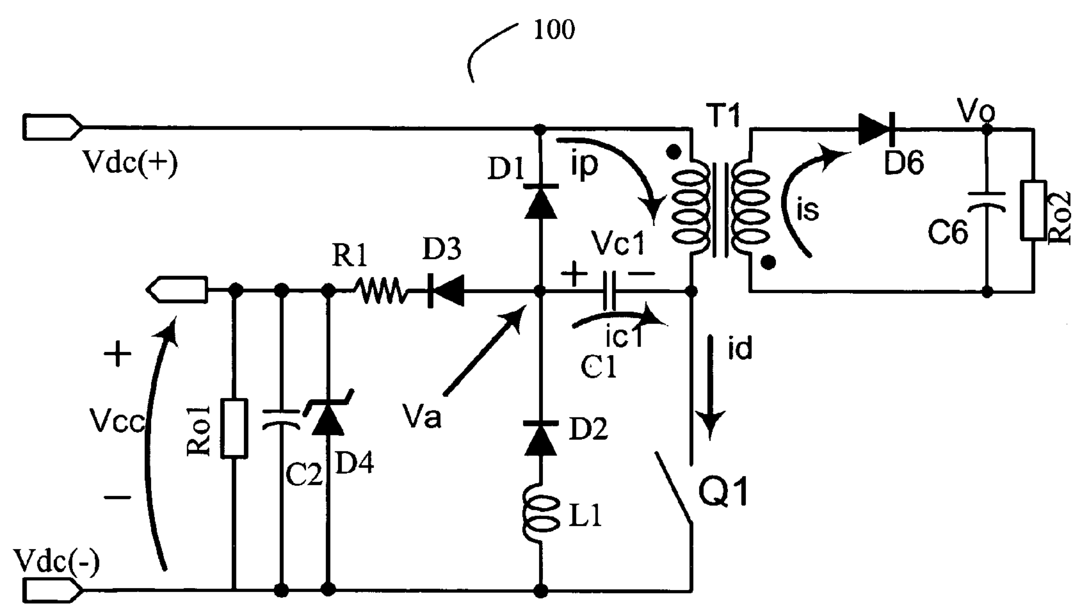
FIG. 3 illustrates the definition of currents in the converter-controller circuit according to embodiments of the invention.
Figure 4:
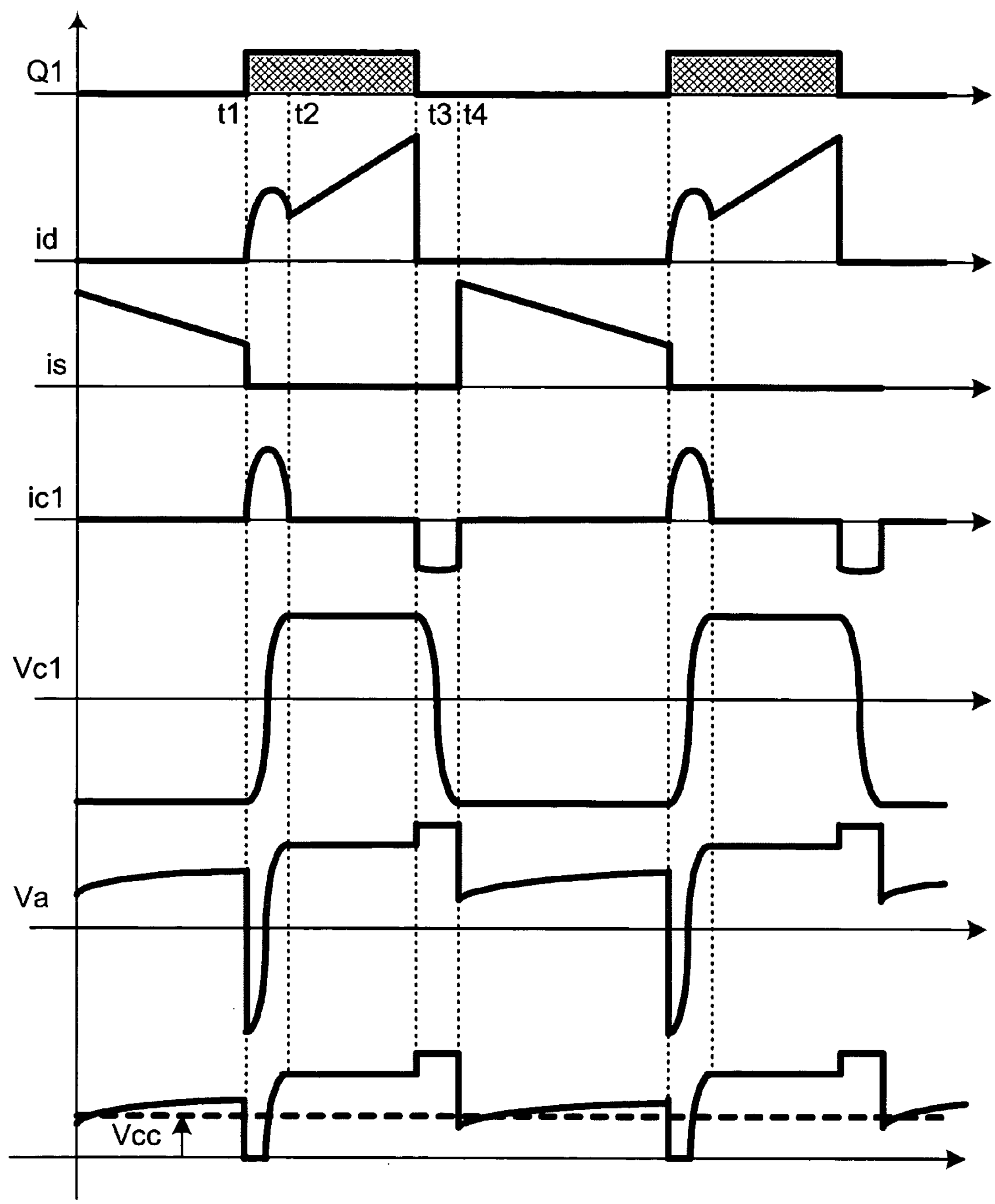
FIG. 4 illustrates various voltages and currents according to an embodiment of the invention.

FIGS. 3–5 illustrate the operation of converter-controller 100.

FIG. 3 illustrates the labeling of currents. The current flowing across primary winding N1 is labeled ip, the current flowing through resonant capacitor C1 is labeled ic, and the current flowing through power device Q1 is labeled id. From Kirchhoff's laws in general id=ip+ic. The current in the secondary circuit is labeled is.

FIG. 4 illustrates the various current and voltage levels during switching cycles of a flyback embodiment. Such diagrams are sometimes referred to as timing diagrams, or waveforms. FIGS. 5A–D illustrate the corresponding current paths during the switching cycles. The current carrying circuit elements indicated by thickened lines.

The first graph of FIG. 4 indicates the switching status of power device Q1. Power device Q1 is switched OFF before time instance t1, then it is switched ON at time instance t1 and switched OFF at time instance t3, the process controlled by control logic U1. The current flowing into power device Q1 is zero, when power device Q1 is switched OFF, i.e. before t1 and after t3. In the t1~t3 interval id differs from zero.

Figure 5A:
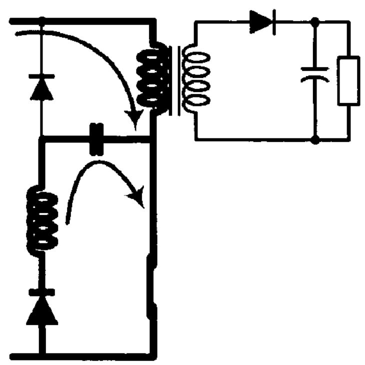
FIGS. 5A–D illustrate the current paths in various time intervals according to a flyback converter embodiment of the invention.

FIG. 5A illustrates that in the t1~t2 time interval both primary coil current ip and resonant circuit current ic are clockwise, and thus add up to a non-zero power device current id. In the interval t1~t2, ip steadily rises, whereas ic approximately follows a sinusoidal form, adding together to a rising peaked pattern, as shown. The resonant current ic first discharges resonant capacitor C1, then charges with opposite polarity in this t1~t2 interval. This discharging-recharging process is illustrated in the fifth graph of FIG. 4, showing a resonant capacitor voltage Vc1 starting from a finite negative value, go through zero, and reach a positive value of approximately the same magnitude. In this t1~t2 time interval the voltage of central node 112, Va, tracks the behavior of Vc1 as shown in the sixth graph of FIG. 4.

Figure 5B:
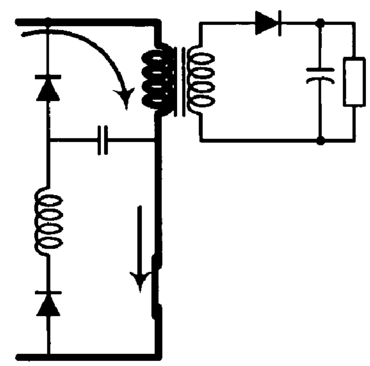

FIG. 5B illustrates the current paths in the interval t2~t3. The time instance t2 is approximately the half-period of resonant circuit 104, therefore, at t2 resonant current ic would change sense. However, resonant diode D2 prevents ic from turning negative. Therefore, in the interval t2~t3 the resonant current remains essentially zero: ic=0. Therefore, in this interval id=ip, steadily rising, as shown. The slope of current depends on the amplitude of Vdc and the primary inductance of T1. Since ic=0, resonant capacitor C1 is not charged, thus Vc1 remains essentially constant, as shown in the fifth graph of FIG. 4. By t2 central node voltage Va is pulled up to a finite value, as shown in the sixth graph of FIG. 4.

Figure 5C:
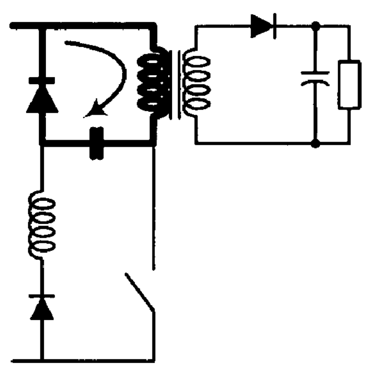

FIG. 5C illustrates the current paths in the t3–t4 interval. At time instance t3, power device Q1 is switched off by control logic U1, controlling the gate of Q1. This sets power device current id=0. Kirchhoff's laws force the primary current ip across resonant capacitor C1, therefore, ic=−ip. Resonant diode D2 still prevents current flow into the rest of resonant circuit 104. However, a current path is possible across linking diode D1, as shown. In this time interval resonant capacitor C1 is discharged and then recharged to restore its initial polarity, as shown in the Vc1 graph of FIG. 4. If linking diode D1 is conducting, the voltage level Va becomes the applied DC voltage Vdc until time instance t4, as shown in the FIG. 4. Finally, at t4, the central node voltage Va returns to its steady state value reflected from the secondary side to the primary side.

Figure 5D:
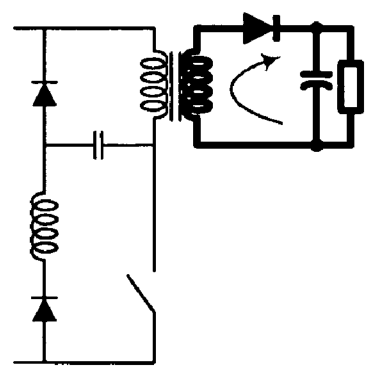

FIG. 5D illustrates that the process of FIG. 5C goes on until resonant capacitor C1 is recharged to its initial negative value. Once this is achieved, the primary current ip, which was recharging resonant capacitor C1, ceases. However, the stored energy of transformer T1 is now released into the secondary circuit, as seen from the is waveform in FIG. 4.

In a general sense it can be said that in the time interval t1~t3 energy is being built up in the primary circuit of the converter. Then, after time instance t3 the energy is released from the primary circuit to the secondary circuit.

As seen in the Va waveform in FIG. 4, central node voltage Va is rectified by diode D3 and regulated by zener diode D4 so as to generate a required operating voltage of Vcc as shown in FIG. 4. This voltage Vcc is then used to power control logic U1.

As is clear from the Va waveform of FIG. 4, a key aspect of a Flyback converter is that the value of the voltage induced in secondary coil N2 is determined by the length of the ON and OFF intervals.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A converter-controller, operable to control a converter having a transformer, the transformer having a primary and a secondary coil, the converter-controller comprising:

a power device, coupled to the primary coil of the transformer;

a resonant circuit, coupled to the primary coil and the power device;

a voltage regulator, coupled to the resonant circuit; and a control logic, coupled to the voltage regulator, wherein the control logic is configured to operate the power device at an essentially constant frequency by varying the length of switch-ON and switch-OFF intervals of the power device;

wherein the resonant circuit is operable to provide operating for the control logic.

2. The converter-controller of claim 1, wherein the resonant circuit comprises:

a central node;

a resonant capacitor, coupled between the central node and the power device;

a resonant diode, having an anode and a cathode, the cathode of the resonant diode coupled to the central node; and a resonant inductor, coupled between the anode of resonant diode and a ground.

3. The converter-controller of claim 2, wherein the voltage regulator comprises:

a regulator diode, having an anode and a cathode, the anode of the regulator diode coupled to the central node;

a regulator resistor, coupled to the cathode of the regulator diode;

a Zener diode, coupled between the regulator resistor and a ground; and a regulator capacitor, coupled in parallel to the Zener diode.

4. The converter-controller of claim 3, wherein:

the control logic is coupled in parallel to the regulator capacitor.

5. The converter-controller of claim 3, wherein:

one or more of the regulator diode, the Zener diode, the regulator capacitor, the regulator resistor, the resonant circuit, the power device, and the control logic is formed on an integrated circuit.

6. The converter-controller of claim 1, wherein the power device is one of a MOS-FET, a bipolar junction transistor, and an insulated gate bipolar transistor.

7. The converter-controller of claim 1, wherein:

the control logic is coupled to a gate of the power device; and the control logic is operable to control an on-off time of the power device.

8. The converter-controller of claim 3, wherein the converter comprises:

a high voltage link, coupled to the primary coil.

9. The converter-controller of claim 8, wherein the high voltage link is coupled to at least one of a DC source and a rectified AC source.

10. The converter-controller of claim 8, wherein:

the central node of the resonant circuit is coupled to the high voltage link through a connecting diode; and the regulator resistor is coupled to the high voltage link through a connecting resistor.

11. The converter-controller of claim 1, wherein:

the secondary coil of the transformer is coupled to the control logic, operable to provide a feedback signal.

12. The converter-controller of claim 11, wherein the secondary coil is coupled to the control logic through a coupled photodiode-phototransistor pair.

13. A converter-controller, operable to control a converter having a transformer, the transformer having a primary and a secondary coil, the converter-controller comprising:

a power device, coupled to the primary coil of the transformer;

a series resonant circuit, coupled to the primary coil and the power device;

a voltage regulator, coupled to the resonant circuit; and a control logic, coupled to the voltage regulator, wherein an operating voltage of the control logic is clamped;

wherein the resonant circuit is operable to provide operating power for the control logic.

14. The converter-controller of claim 13, wherein the operating voltage of the control logic is clamped below 10 Volts.

15. The converter-controller of claim 13, wherein the resonant circuit comprises:

a central node;

a resonant capacitor, coupled between the central node and the power device;

a resonant diode, having an anode and a cathode, the cathode of the resonant diode coupled to the central node; and a resonant inductor, coupled between the anode of resonant diode and a ground.

16. The converter-controller of claim 13, wherein the voltage regulator comprises:

a regulator diode, having an anode and a cathode, the anode of the regulator diode coupled to the central node;

a regulator resistor, coupled to the cathode of the regulator diode;

a Zener diode, coupled between the regulator resistor and a ground; and a regulator capacitor, coupled in parallel to the Zener diode.

* * * * *